United States Patent
Tsaruk et al.

(10) Patent No.: US 11,736,621 B2
(45) Date of Patent: Aug. 22, 2023

(54) METHOD OF QUICK CONNECTION OF PSTN MODEMS AND PSTN MODEM WITH FAST CONNECTION ACCORDING TO SUCH METHOD

(71) Applicant: Oleksandr Vasylyovych Tsaruk, Kyiv (UA)

(72) Inventors: Oleksandr Vasylyovych Tsaruk, Kyiv (UA); Viktor Vasylyovych Romanov, Kyiv (UA)

(73) Assignee: Oleksandr Vasylyovych Tsaruk, Kyiv (UA)

( * ) Notice: Subject to any disclaimer, the term of this patent is extended or adjusted under 35 U.S.C. 154(b) by 0 days.

(21) Appl. No.: 17/905,640

(22) PCT Filed: Mar. 12, 2021

(86) PCT No.: PCT/UA2021/000023
§ 371 (c)(1),
(2) Date: Sep. 5, 2022

(87) PCT Pub. No.: WO2021/183091
PCT Pub. Date: Sep. 16, 2021

(65) Prior Publication Data
US 2023/0110136 A1    Apr. 13, 2023

(30) Foreign Application Priority Data
Mar. 13, 2020   (UA) .............................. A 2020 01777

(51) Int. Cl.
*H04M 11/06* (2006.01)
(52) U.S. Cl.
CPC ................... *H04M 11/066* (2013.01)
(58) Field of Classification Search
CPC .. H04M 11/062; H04M 11/06; H04M 7/0069; H04M 7/125; H04M 7/006;
(Continued)

(56) References Cited

U.S. PATENT DOCUMENTS

| | | | | | |
|---|---|---|---|---|---|
| 4,792,940 | A | * | 12/1988 | Hiraguchi | H04L 25/03133 370/292 |
| 5,353,280 | A | * | 10/1994 | Ungerbock | H04M 11/06 370/252 |
| 5,828,657 | A | * | 10/1998 | Betts | H04B 3/238 370/269 |

(Continued)

FOREIGN PATENT DOCUMENTS

| EP | 0 225 652 A2 | 6/1987 |
|---|---|---|
| EP | 0 601 260 A1 | 7/1994 |
| WO | 99/12300 A2 | 3/1999 |

*Primary Examiner* — Akelaw Teshale

(57) ABSTRACT

A method of quick set up of PSTN modem connection is proposed. The method of quick set up of PSTN modem connection comprises: setting access to the data channel, identifying channel characteristics, configuring PSTN modems depending on the characteristics of the channel, configuring echo compensators of PSTN modems, negotiating the connection protocol and data transfer between PSTN modems according to the configuration using the agreed protocol where: data transmission is carried out in duplex mode with the separation of signals of reception and transmission by echo compensation, identification of channel characteristics and adjustment of the echo compensator of each of the PSTN modems is performed, respectively, when receiving and transmitting at least one training sequence by each PSTN modem, access to the data channel is carried out by sending call by PSTN modem, which contains the training sequence and connection parameters for negotiation, where using a multiple access protocol, when each of the PSTN modems is connected to the data channel asynchronously, without agreeing on the time of connection and without the need to pre-allocate the roles of calling and responding modems.

9 Claims, 4 Drawing Sheets

(58) Field of Classification Search
CPC ............... H04M 3/002; H04M 3/2209; H04M 2201/52; H04M 3/2272; H04M 11/066; H04M 2201/40; H04M 2203/2066; H04M 1/2535; H04M 9/082; H04M 1/253; H04M 3/22; H04M 3/306; H04M 7/0072; H04M 1/6033; H04M 1/72415; H04M 2207/20; H04M 7/1245; H04M 3/4281; H04M 1/24; H04M 7/1255; H04M 1/58; H04M 1/6505; H04M 2207/203; H04M 3/304; H04M 3/30; H04M 3/247; H04M 3/2263; H04M 3/18; H04M 11/00; H04M 1/82; H04M 1/57; H04M 7/1295; H04M 1/00; H04M 7/06; H04M 7/0078; H04M 7/0057; H04M 7/0048; H04M 3/56; H04M 3/301; H04M 3/005; H04M 2250/06; H04M 1/72502; H04M 1/725; H04M 1/72478; H04M 2203/2027

See application file for complete search history.

(56) References Cited

U.S. PATENT DOCUMENTS

| | | | | |
|---|---|---|---|---|
| 6,094,422 | A | * | 7/2000 | Alelyunas ................ H04B 3/23 379/406.06 |
| 6,240,128 | B1 | | 5/2001 | Banerjea et al. |
| 6,421,376 | B1 | * | 7/2002 | Williams .............. H04L 5/1438 379/345 |
| 6,560,321 | B1 | | 5/2003 | Chen et al. |
| 7,369,516 | B1 | * | 5/2008 | Fisher ...................... H04B 3/23 370/292 |
| RE42,661 | E | * | 8/2011 | Olafsson ............. H04L 25/4902 379/93.31 |
| 2001/0038674 | A1 | | 11/2001 | Trans |
| 2004/0146148 | A1 | | 7/2004 | Olafsson et al. |
| 2004/0148225 | A1 | | 7/2004 | Olafsson |
| 2006/0159244 | A1 | * | 7/2006 | Olafsson ................ H04L 27/02 379/93.32 |

* cited by examiner

METHOD OF QUICK CONNECTION OF PSTN MODEMS AND PSTN MODEM WITH FAST CONNECTION ACCORDING TO SUCH METHOD

FIELD OF THE INVENTION

The invention relates to the field of telecommunications and can be used for data transmission between end devices connected to modems. Physical lines or tone channels, including Public Switched Telephone Network (PSTN) channels, may be used as the transmission medium. In this description, the term "modem" refers to a PSTN modem.

BACKGROUND OF THE INVENTION

There are modems that are designed to connect to Internet providers and transmit data over the Internet: modem COM320 (https://www.campbellsci.com/com320), modem Sportster Voice 33.6 Fax-Modem manufactured by US Robotics (http://www.usr.com), Windows-fax modem SupraFax Modem 33.6i PnP made by Diamond Multimedia (http://www.diamondmm.com). The main disadvantage of such devices is the relatively long connection time. This disadvantage is particularly significant when using modems to provide voice services, for example to provide voice communication over a data channel formed by modems. In this case, the establishment of communication between subscribers occurs each time after dialing the subscriber's number and "picking up the phone" by the subscriber's modem. Establishing connections between such modems is performed in accordance with the recommendations of ITU-T V.34, V.32bis, V.32 and is at least 7 seconds. During this time, the characteristics of the channel are identified and the modems are adjusted according to the state of the channel, echo compensators are adjusted, speeds and signal parameters are matched. Only after performing the aforesaid operations the data transfer begins. However, for voice telephone connections, the comfortable waiting time for subscribers to connect should not exceed 2-3 seconds. In this case, in the case of disconnection (due to interference and short interruptions), the process of establishing an interrupted connection involves repeating the entire procedure of establishing a connection from the beginning, which multiplies the time to establish a connection.

There is a method of establishing a modem connection by measuring the connection parameters, preferably via Ethernet, and calibrating (adjusting) the parameters of the channels and synchronization signals (US2001038674 (A1) dated Nov. 8, 2001). The use of this method to improve data transmission over tone channels is not provided.

There is a known protocol for establishing a facsimile connection, which provides for the reduction of connection establishment time by introducing the adaptability of the phase of evaluation of channel characteristics and completion of the phase after reaching the specified characteristics of the accuracy of parameter evaluation (U.S. Pat. No. 6,560,321 (B1) dated 5 Jun. 2003). The mentioned protocol has the advantage of reduced connection times only for channels with low signal propagation time (short response time) and does not give an advantage in connection speed for channels with long signal propagation time.

In US2004146148 (A1) dated Jul. 29, 2004 reduction of connection set up time in the data transmission system using modems is provided using accumulation and the subsequent use of results of identification of characteristics of the channels on which connections were already carried out. As a result, the connection time using the V90 protocol is from 4 to 10 seconds. This approach has a relatively low efficiency due to the changeability of the properties of the channel over time. There are also assumptions about the use of algorithms with low convergence rate.

The known is a method of connecting modems in duplex mode, described in EP0601260 (A1) dated Jun. 15, 1994. This method involves pre-determining of the modem that is calling and the modem that is receiving. Then the evaluation of the parameters of the channel, followed by setting the echo compensator and equalizer of each of the modems in duplex mode is carried out. Thus this method first sets and implements the connection parameters of the modems, and for the already established connection evaluation of the characteristics of the transmission path is performed. At the same time, setting up modems in duplex mode leads to an increase in setup time and deterioration of its accuracy because the setup takes place in conditions of a high level of noise. In this case, the noise is the remnants of the uncompensated echo from the echo compensator, which has not been set yet. Such remnants of the uncompensated echo interfere with the operation of algorithms for identifying the parameters of the received signal. For echo compensator setup algorithms, the noise is the received signal on the background, which will appear as the signal of the own modem that needs to be compensated. Thus, the connection of modems according to EP0601260 (A1) provides a combination of configuration procedures due to the simultaneous transmission of the training sequence, which leads to a sharp deterioration in the accuracy of the echo compensator set up and the accuracy of estimating channel parameters and inevitably limit the data rate transmission. The method, according to EP0601260 (A1), requires splitting bands and low-speed transmission of parameters in duplex mode, which does not provide advantages for fast connection of modems and reduces the maximum achievable transmission speed of the modem at least by two times.

The closest to the claimed method is a method of set up of modem connection, described in WO9912300 (A2) dated Nov. 3, 1999. But WO9912300 (A2) does not describes the connection protocol negotiation including role allocation, signal parameter negotiation, and data rate wherein the distribution of roles includes assigning the modem that first received the call as the answering modem, followed by this modem sending a message in response to the modem from which the call was received. And the closest to the claimed PSTN modem is a PSTN modem with fast connection set up, described in EP0225652 (A2) dated 16 Jun. 1987. But EP0225652 (A2) does not describes the automatic connection protocol what is suitable for connection protocol negotiation that includes role allocation, signal parameter negotiation, and data rate wherein the distribution of roles includes assigning the modem that first received the call as the answering modem, followed by this modem sending a message in response to the modem from which the call was received.

THE PURPOSE OF THE INVENTION

The invention is based on the task of developing a new protocol for connecting modems using fast algorithms for identifying the characteristics of the channel to reduce the time to establish a duplex connection.

The problem is solved in such a way that, according to the invention, the method of quick connection of PSTN modems involves establishing access to the data channel, identification of channel characteristics, setting PSTN modems depending on the characteristics of the channel, setting echo compensators of the PSTN modems, coordinating connection protocol and data transfer between PSTN modems according to the configuration using the agreed connection protocol. Whereas according to this method, data transmission is carried out in duplex mode with the separation of reception and transmission signals by echo compensation, identification of channel characteristics and adjustment of the echo compensator of each of the PSTN modems are performed, respectively, when receiving and transmitting at least one training sequence by each PSTN modem, access to data transmission is carried out by sending a call by PSTN modem, which contains the training sequence and connection parameters for negotiation. Whereas using a multiple access protocol, when each of the PSTN modems is connected to the data channel asynchronously, without agreeing on the time of connection and without the need to pre-allocate the roles of calling and responding modems.

According to one of the preferred embodiments of the invention, the negotiation of the connection protocol may include the distribution of roles, the coordination of signal parameters and transmission data rates. Role allocation refers to the assignment of the calling modem and the responding modem for a given period of data transmission.

According to another preferred embodiment of the invention, after turning on each of the PSTN modems enters into the call reception mode, and in the absence of a call, each PSTN modem transmits a call sequence, and then enters into the mode of receiving a response.

According to yet another preferred embodiment of the invention, an independent pause assignment after being called by each PSTN modem (TimeOut) is carried out. The pause is defined as a random variable that has a distribution of the baseline value close to normal, the mean value of which is preferably greater than the expected delay in the channel (round trip), and is within the standard deviation less than the mathematical expectation of time delays. The means of randomly determining the pause can be estimated by hardware as well as software. In the case of hardware implementation, such a component of the PSTN modem can be a sensor of random or pseudorandom numbers (pseudo-random number generator (PRNG)). In the case of software implementation, a software pseudo-random number generator can be used.

According to another preferred embodiment of the invention, the conditions of normality of the random variable distribution and standard deviation can be determined by a PSTN modem based on a machine learning algorithm.

According to another preferred embodiment of the invention, after receiving the response, the PSTN modem determines mutually acceptable parameters of the data signal and the data rate, followed by transmitting the sequence of confirmation of the selected parameters to another PSTN modem and start transmitting information at the agreed rate.

According to another preferred embodiment of the invention, random numbering of each call and ignoring the answer with the number that coincides with the number of the last call can be applied.

According to another preferred embodiment of the invention, the distribution of roles may include assigning the modem that first received the call, the answering modem, followed by sending this modem a message in response to the modem from which the call was received.

The invention is also based on the task of developing a PSTN modem with a short connection time according to the method described above.

This problem is solved by the fact that the PSTN modem according to the invention comprises means of transmitting data in duplex mode, means of connecting to a telephone line, coding means, decoding means, modulation means, demodulation means, digital-to-analog converter and analog-to-digital converter, scrambler, descrambler, serializer, deserializer, equalizer, echo compensator. Whereas PSTN—the modem further comprises an automatic connection protocol processor, the input of which is connected to the output of the serializer, the output of the decoder and the input of the frequency response corrector, and the output of the automatic connection protocol processor is connected to the means of data transmission in duplex mode. Moreover, the automatic connection protocol processor is suitable for alternating the phases of connection establishment and installation of connection protocol data depending on the results of the evaluation of the characteristics of the channel by the modem and the information received from the modem from which the response was received.

According to one of the preferred embodiments of the invention, a switch is used as means of data transmission in duplex mode. In this case, the automatic connection protocol processor is connected to the switch to transmit control data to the switch and to transmit connection protocol data. The connection protocol data includes the connection phase and the data rate and the parameters of the data transmission signal.

According to another preferred embodiment of the invention, the PSTN modem further comprises an amplitude-frequency response corrector, and the input of the automatic connection establishment protocol processor is connected to the output of the amplitude-frequency response corrector.

The technical result from the use of this method and device is reducing time needed to establish a duplex connection of modems to at least one second, as well as reducing the connection recovery time after strong interference and short communication breaks by reducing the number of connection phases, reducing the duration of each phase, the continuation of the connection protocol from the failed phase, without the need to repeat all phases of connection from the very beginning.

The obtained technical result is explained by the fact that:
the connection protocol of PSTN-modems of the claimed design has the means to resolve conflicts (when overlapping calls), which are implemented on the basis of random intervals between calls of each of the modems,
each of the two PSTN modems involved in the connection may be the one that calls or the one that responds, depending on which of the modems will be the first to receive a valid call from another modem. Whereas the modem that received the call becomes the responding modem,
the mode of operation of PSTN modems (calling and responding) is not fixed before the connection and can be changed during the connection to continue the connection process (for example, in case of interruption) with the phase of the connection proposed by the modem of the correspondent,
the claimed PSTN-modem has the means of numbering the call and identifying the echo of its call, which allows connections on channels with a long propagation time. These means are implemented in the form of a mechanism for random numbering of calls by each subscriber and can be realised both hardware and software, similar to the means of random pause detection.

BRIEF DESCRIPTION OF THE DRAWINGS

The invention is illustrated by an example of embodiment of a fast PSTN modem with a quick connection and a method of fast connection between such PSTN modems. The example is illustrated by the following images.

Figure 1:
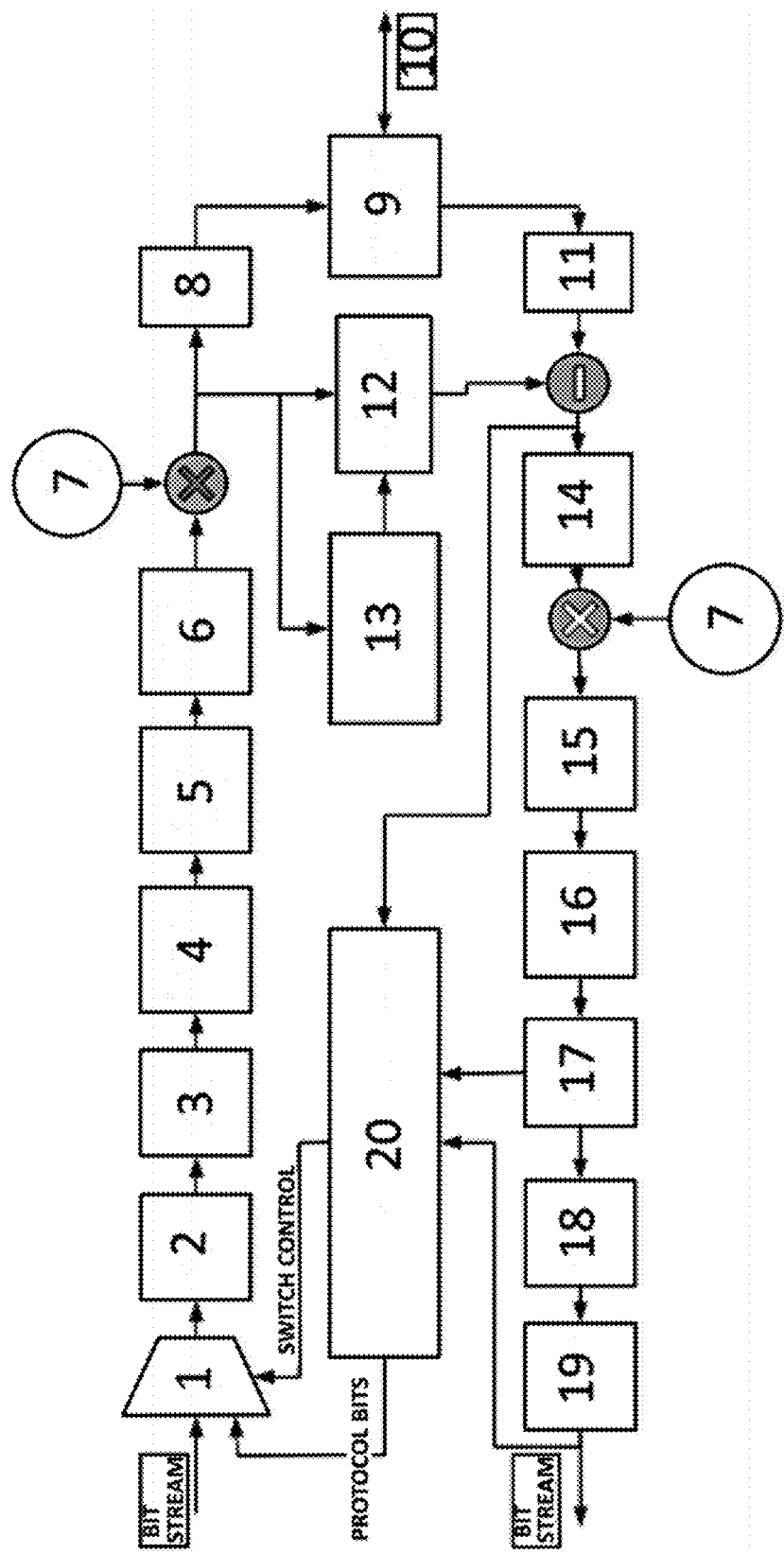
FIG. 1 is a block diagram of a PSTN modem with fast connection.

These examples and the images used do not limit other possible embodiments of the invention, but only explain its essence and confirm the feasibility.

DETAILED DESCRIPTION OF THE INVENTION

The PSTN modem includes a switch (1) as a means of transmitting data in duplex mode, the input of which is fed with data for transmission in the form of a bit stream. The output of the switch (1) is connected to a series-connected scrambler (2), deserializer (3), encoding means: a lattice encoder (4) and a signal encoder (5) and a low-frequency transmission filter (6). The output of the low-frequency transmission filter (6) and the reference frequency generator (7) are connected to the modulator. The output of the modulator is connected to a digital-to-analog converter, DAC (8). The output of the DAC (8) is connected via differential circuit (9) with telephone line PSTN (10). The output of the differential circuit (9) is connected to an analog-to-digital converter, ADC (11). The PSTN modem also includes an echo compensator filter (12), the input of which is connected to the modulator and the unit for calculating the echo suppression coefficients (13), the frequency response corrector (14), and a series-connected input filter (15), equalizer (16) Viterbi decoder (17) as a decision-making device, descrambler (18) and serializer (19). A band-pass adaptive filter is used as the input filter (15).

The PSTN modem further comprises an automatic connection protocol processor (20), the input of which is connected to the output of the serializer (19), the output of the Viterbi decoder (17) and the input of the frequency response corrector (14). The output of the automatic connection protocol processor (20) is connected to the switch (1) for transmitting control data of the switch and for transmitting data of the connection protocol. The automatic connection protocol processor (20) is a processor device suitable for alternating connection establishment and connection protocol data depending on the results of the modem channel evaluation and the information received from the modem from which the response is received.

To transmit data over the telephone line, the bitstream obtained through the switch (1) is scrambled using a scrambler (2) and grouped into groups of several bits in the deserializer (3). The number of groups depends on the transmission rate and is encoded by the lattice encoder (4) in accordance with the rules of convolutional coding. Each symbol from the output of the lattice encoder (4) is displayed in the signal encoder (5) in the symbols of the signal constellation (see FIG. 3). The symbols are represented by complex numbers that reflect the amplitude and phase of the samples of the symbol during data transmission. Samples corresponding to the transmitted symbols are fed to the input of the low-frequency transmission filter (6). From the output of the low-frequency transmission filter (6), the samples in the integrated view are fed to the modulator. In the modulator, the complex signal samples are multiplied by sinusoidal and cosine samples from the reference frequency generator (7), respectively. At the output of the modulator, the orthogonal components of the signal are summed and fed to the DAC (8), from which through the differential circuit (9) are transmitted to the telephone line (10).

The signal from the transmitter of the correspondent through the telephone line (10) is allocated by the differential circuit (9) and is fed to the ADC (11). The ADC (11) converts the analog signal into a sequence of real numbers that reflect the value of the analog signal at the time of sampling. The input sequence is filtered in the frequency response corrector (14) in order to increase the signal-to-noise ratio. From the output of the frequency response corrector (14) the signal is fed to the demodulator, which converts the sequence of real numbers into a sequence of complex numbers, which reflects the value of the demodulated signal (analytical representation). The demodulated signal passes through the equalizer (16), which adjusts the phase and frequency characteristics of the channel and enters the Viterbi decoder (17). Next, the character stream is descrambled in the descrambler (18) and converted into a bit stream through the serializer (19). In this case, the automatic connection protocol processor (20) provides alternation of connection phases and setting of connection parameters (in particular, data transmission rate) depending on the results of evaluation of channel characteristics by the modem and information received from the correspondent modem.

The operation of a PSTN modem in duplex mode can be divided into two periods: connection set up and data exchange. The connection is established from the moment the command is received from the terminal to set up a connection. The two modems are considered equivalent devices, but the modem that received the command to set up the connection is considered the calling modem. Such a modem starts sending call signals at random intervals. The modem that first accepted the correspondent's modem call answers the call. In the process of transmitting a call and answering a call, each of the modems configures the echo compensator. In the process of receiving a call and receiving a response to a call, each of the modems evaluates the frequency and statistical parameters of the channel, adjusts the frequency response corrector (14) and the input filter (15).

Figure 2:
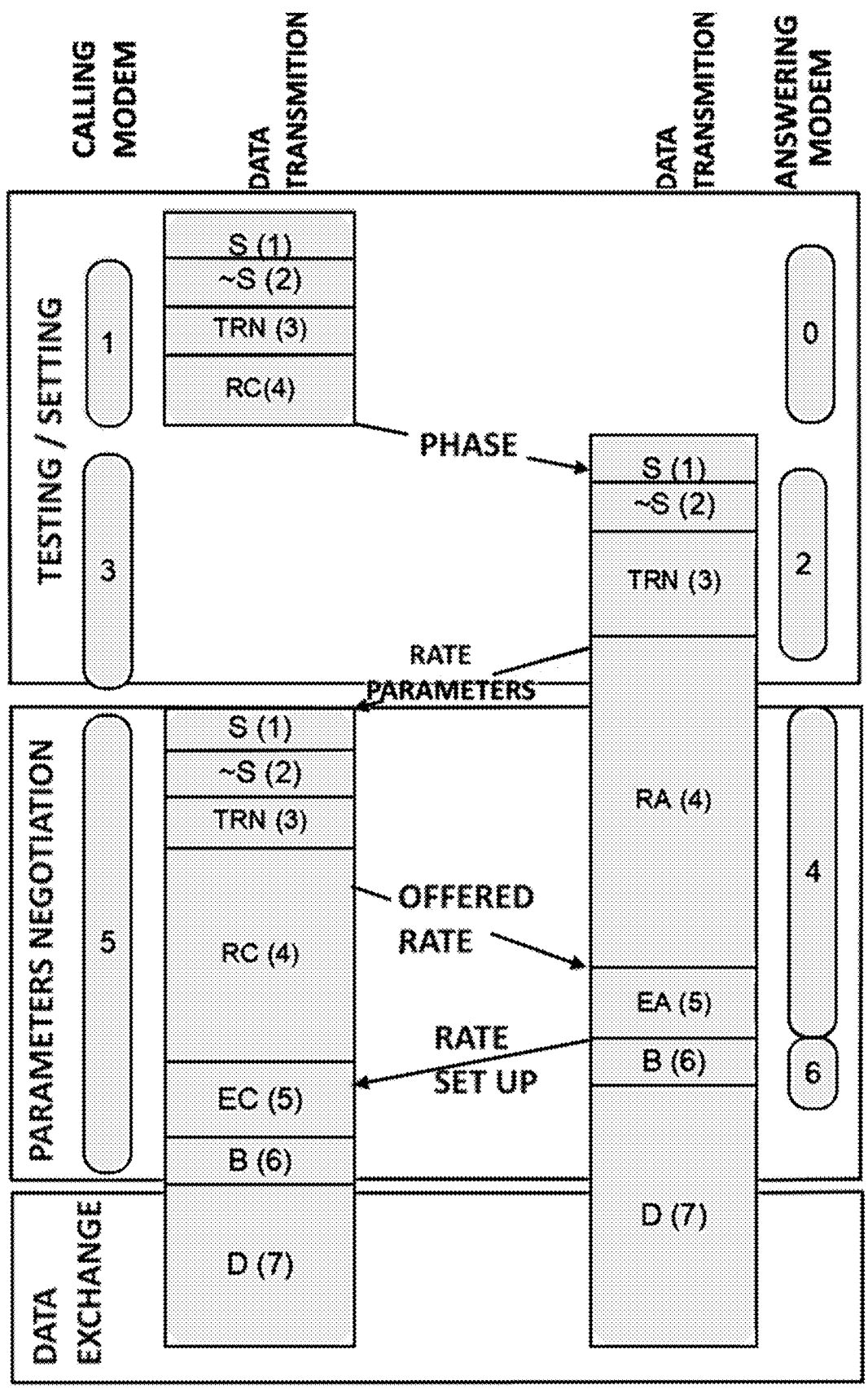
FIG. 2 is a schematic drawing of the connection protocol of two PSTN modems, FIG. 3—constellations of signals 4PM (A) and 8PM (B), which are used in the connection protocol of PSTN modems.
Figure 3:
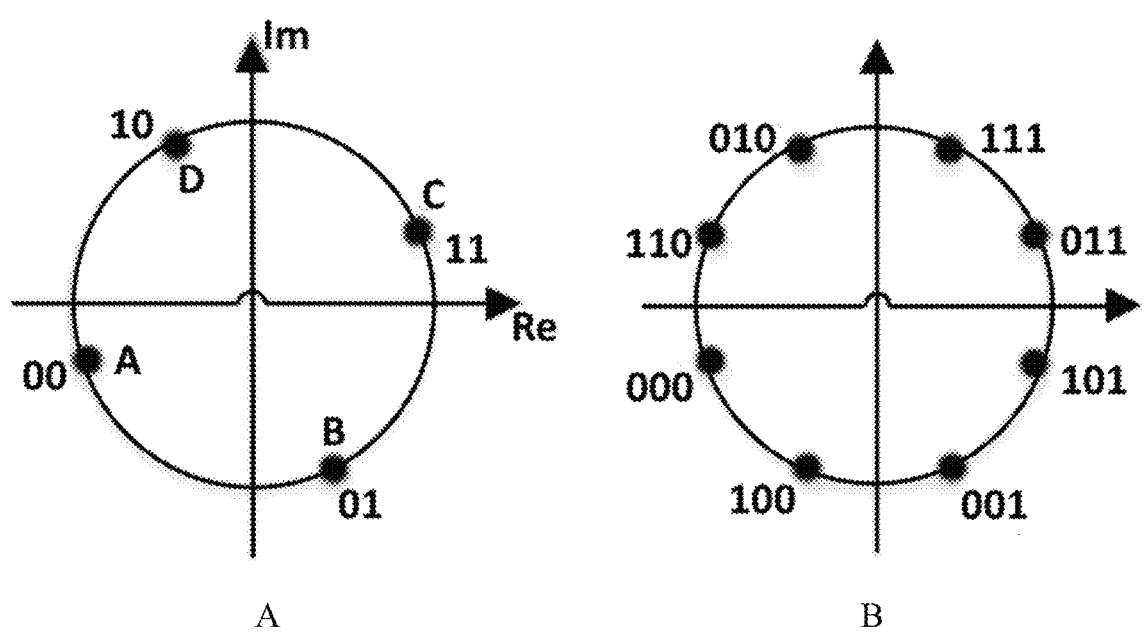

The connection set up sequence can be represented as alternating the following phases of the modem operation and the operation phases of the modem transmitter shown in the PSTN modem operation diagram in FIG. 2. On FIG. 2 and in the following explanation of the operation of the modem and modem transmitter, the following indications are used:

S—sequence ABABAB . . . length of 32 clock intervals (32T);

S—sequence CDCDCD . . . length 8T;

TRN—scrambled units at a speed of 4800 bps, here the flow rate (sequence of two bits) is not encoded, not scrambled, and directly displayed in state A, B, C or D (FIG. 3);

RC—signals selecting the speed of the calling modem;

RA—answering modem speed selection signals;

EC—the end of the speed selection signal by the calling modem;

EA—the end of the speed selection signal by the answering modem;

B—executive units, which are scrambled and encoded in the same way as the data transmitted after, S, ¬S, TRN, ¬TRN are transmitted using the constellation PM4, without scrambling and lattice coding, RC, RA, EC, EA are transmitted using the constellation PM8 with coding (R=2/3) and scrambling, and B and D are transmitted with coding, scrambling and at the selected rate (R=2/3) or QAM-32 (R=4/5) or QAM128 (R=6/7).

List and encode parameters to match connection parameters:

Coding of connection parameters (RA, RC)
The first word RA, RC (16 bits)
_SkewTr=$f000;—Request Skew transmitter AFC: Skew: <8-left,>8-right)
_KoefSN=$f000;—s/n estimation or transmitter frequency correction request}
_NonLin=$0800;—Channel nonlinearity found
_CoeFSN=$0400;—s/n transfer sign in first hex digit of SkewTr
_MadeSkewTr=$0200;—Transmitter frequency correction is realized
_Reconnect=$0100;—Parameter exchange completed
_AsimSpeed=$0080;—Asymmetrical speed available
_isRND=$0004;—Random number take place in first hex digit
_hDupl_av=$0020;—hDuplex mode available
_UseV25=$0010;—To use V.25 protocol mandatory
_Wire=$0008;—Wire/Radio h-Duplex mode set
_hDupl=$0040;—h-Duplex mode
_Faza=$0003; {—Connection Phase}
The second word RA, RC (16 bits)
_9600t=$0080;—9600 transmit available
_9600r=$0040;—9600 receive available
_4800r=$0010;—4800 receive available
_4800t=$0020;—4800 transmit available
_14400t=$0008;—14400 transmit available
_14400r=$0004;—14400 receive available
_14400r=$ff00;—CRC8 of two words Description of modem phases:

| | |
|---|---|
| FazaMod = 0 | The receiver is active, searching for the beginning of the call or answer the call from the correspondent, the transmitter is blocked (FazaRes = 8) |
| FazaMod = 1 | The transmitter issues a call (phases 1-4), the receiver is locked (FazaRes = 8) |
| FazaMod = 2 | After receiving the call training sequence of the correspondent, the modem transmitter issues a response to the received call (phases 1-3 of the training sequence), and then definitely goes into phase: FazaMod: = 4; FazaRes: = 4 |
| FazaMod = 3 | The calling modem receives the first three phases (S, −S, TRN) of the training sequence of the modem that corresponds to |
| FazaMod = 4 | Receiving the second training sequence (S, -S, TRN) of the calling modem and issuing a speed selection signal (FazaTr = 4) until the end of receiving the training sequence |
| FazaMod = 5 | Issue of the second training sequence by the calling modem (FazaTr = 1-3), the synchronization of the receiver when receiving R2 (FazaRes = 4) |
| FazaMod = 6 | Issue of EA and B segments by the called modem and reception of the RC segment by the calling modem |
| FazaMod = 7 | Issue of RC, EC, B segments by the calling modem and reception of EA and B segments |
| FazaMod = 8 | Data transmission by the called modem and data reception |
| FazaMod = 9 | Data transmission by the calling modem and data reception |

Transmitter phase description:

| | |
|---|---|
| FazaTr = 0 | Bringing the transmitter into readiness and transfer to phase 1 |
| FazaTr = 1 | Segment S (transmission of ABAB . . . AB) |
| FazaTr = 2 | Segment −S (transmission of CDCD . . . CD) |
| FazaTr = 3 | TRN segment (scrambled units) |
| FazaTr = 4 | Segments R1, R2, R3 (speed selection combinations) |
| FazaTr = 5 | Segment E (speed selection end combination) |
| FazaTr = 6 | Segment B1 (scrambled and coded units) |
| FazaTr = 7 | Data transmission |
| FazaTr = 8 | Issue of zeros in the TLC, preparation of the transmission buffer for the issue of samples of the first phase of the transmitter |
| FazaTr = 9 | Resetting the transmitter output, continuing to issue previously recorded in the transmitter output buffer |
| FazaTr = 10 | Clear the buffer, reset the transmitter into initial condition |

The parameters of the phases of the modem transmitter are presented in the table.

TABLE

Parameters of phases of operation of the modem transmitter

| Transmitter phase | Designation | Modulation type | Word number (16 bits) | Initial character number | Initial sample number (9600 Hz) | Convolutional coding | Scrambling |
|---|---|---|---|---|---|---|---|
| 1 | S | PM4 | 0-3 | 0 | 0 | None | None |
| 2 | ¬S | PM4 | 4 | 32 | 128 | None | None |
| 3 | TRN | PM4 | 5-36 | 40 | 160 | None | None |

TABLE-continued

Parameters of phases of operation of the modem transmitter

| Transmitter phase | Designation | Modulation type | Word number (16 bits) | Initial character number | Initial sample number (9600 Hz) | Convolutional coding | Scrambling |
|---|---|---|---|---|---|---|---|
| 4 | RA, RC | PM8 | 37 . . . | 306 | 1 224 | Present | Present |
| 5 | EA, EC | PM8 | n + 38 | | | Present | Present |
| 6 | B | PM8, QAM16-128 | n + 39-42 | | | Present | Present |
| 7 | D | PM8, QAM16-128 | n + 43 | | | Present | Present |

Description of receiver phases:

| | |
|---|---|
| FazaRes = 0 | Bringing the receiver into readiness for transfer to the first phase |
| FazaRes = 1 | Search in the input signal of segment S (reception of ABAB . . . AB) |
| FazaRes = 2 | Reception of segment -S (reception of CDCD . . . CD) |
| FazaRes = 3 | Reception of the TRN segment identifying the frequency and statistical characteristics of the channel |
| FazaRes = 4 | Receiving RA or RS segments (receiving a combination of speed selection and common speed selection) |
| FazaRes = 5 | Reception of segment EA or EC (reception of a combination of the end of a speed selection) |
| FazaRes = 6 | Reception of segment B (scrambled and coded units). Checking the possibility of transition to the data exchange phase |
| FazaRes = 7 | Data reception |
| FazaRes = 8 | Reception is prohibited, the receiver does not work |

Figure 4:
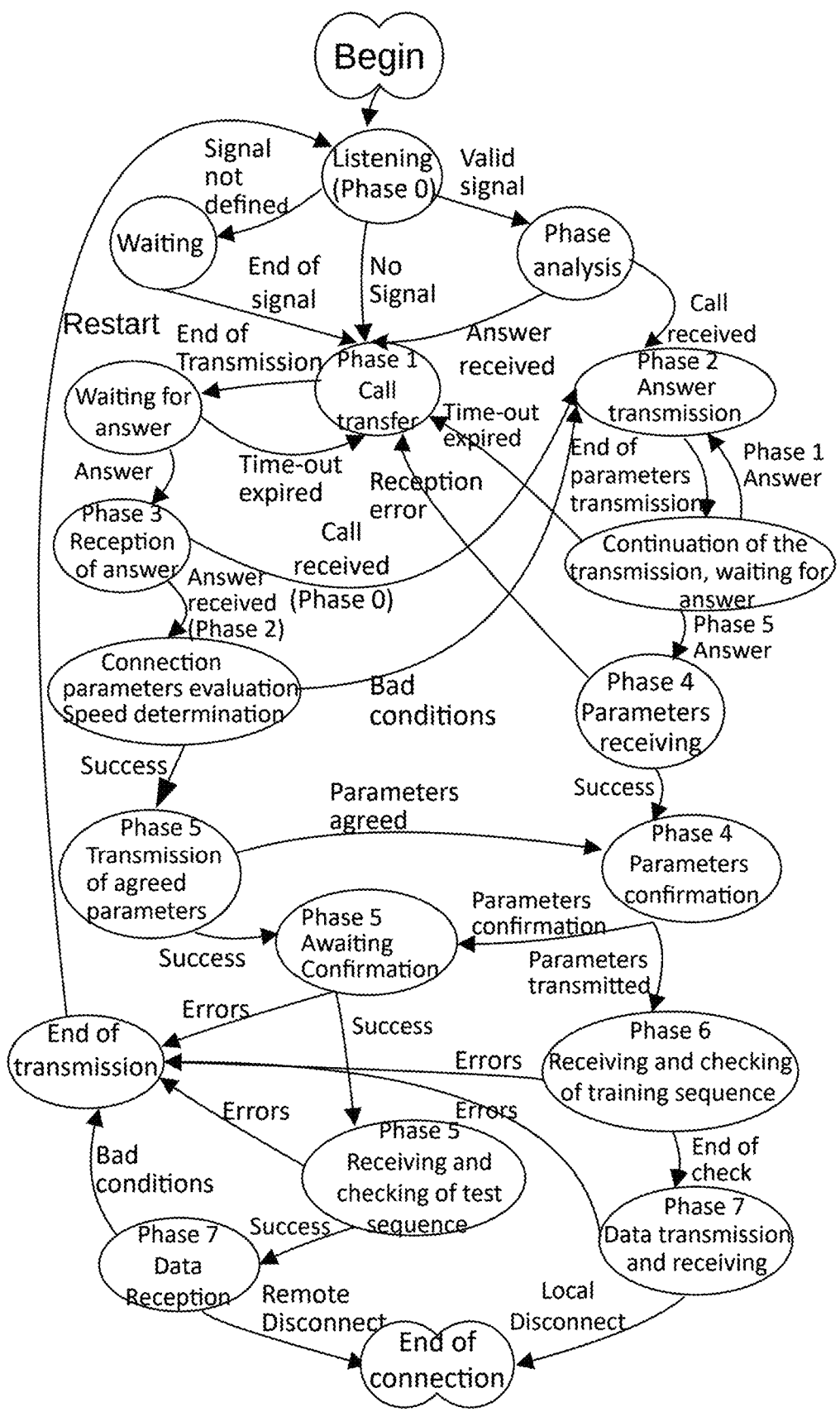
FIG. 4 is a state transition diagram (STD) describing the connection protocol of two PSTN modems.

The connection set up protocol according to the claimed method is also illustrated by a state transition diagram (STD), FIG. 4, which indicates the following steps of connection set up:

Beginning—no need to connect. Transition to the "Listening" mode at the time of receipt of connection command;

Listening (Phase 0)—the mode of listening to the channel, during which the occupancy of the channel signal transmission is evaluated. Prolonged listening is equal to $T_{out}$ (Timeout). After transitioning from the "Listening" mode $T_{out}$ is approximately 10 ms;

Phase analysis—the mode of receiving a call or answer, in which after the detection of the message header the transition is performed. The received message is recognized as a call or as a response to a call. Accordingly, the transition to the answering mode to the call or the calling mode to the answer, in the case when the answer is not expected;

Standby—the mode of completion of the correspondent modem transmission;

Call transfer (Phase 1)—mode of the call transfer. In this mode, the modem passes in the absence of a signal or immediately after the signal (successfully received or not successfully received) of the correspondent modem, as well as after the timeout waiting for a response to a previous call or a previous answer;

Getting an answer (Phase 3)—the mode of waiting and receiving the correspondent's answer to the call. If the timeout is exceeded or the response contains errors (incorrect CRC, Cyclic redundancy check), then the transition to the call transfer mode. After receiving the expected response, the transition to the phase of evaluation of the parameters of the correspondent contained in the response of the correspondent;

Evaluation of connection parameters. Determination of speed—a mode in which the possibility of establishing a connection on the parameters proposed by the modem of the correspondent is analyzed. If such a possibility is considered not to be realized in the current mode of the channel, then is performed the transition to the transmission phase of the response (Phase 2), in which it is proposed to change the connection parameters (speed reduction, input frequency response of the transmitter, increase the transmission level). If the parameters proposed by the modem of the correspondent can be used to establish a connection, the transfer of consent to the use of the proposed parameters is made;

Transfer of agreed parameters (Phase 5)—the mode of transmission of the agreed connection parameters of the correspondent's modem and the transition to the state of waiting for confirmation of the selected parameters;

Awaiting confirmation—mode of waiting for confirmation of selected parameters. If the selected parameters are not accepted by the correspondent's modem or are not accepted reliably, then the transition to the mode of transmission ending is performed;

Obtaining a training sequence (The result of phase 6)—the mode of reception and verification of the training sequence of a fixed length at a given speed. Upon successful reception, the transition to data transfer is performed. In the presence of errors transition to the mode of transmission ending is performed;

End of transmission—a mode in which the transmission of the sequence of the end of transmission is performed and the transmitter is turned off, and then restart by going to the "Listening" mode (listening to the channel);

Data acquisition (Phase 7)—data reception mode of indefinite duration. Exit from this mode is carried out after receiving the sequence of the end of transmission from the correspondent's modem or receiving a command from the local terminal. If it is impossible to receive reliable information from the correspondent's modem, the transition to the mode of the transmission ending is performed for further restart;

Transmission of response (Phase 2)—the smode of transmission of the answer to the successfully accepted call. The answer contains a set of parameters for establishing a connection, as well as an assessment of the signal quality of the received call. The modem also enters into this mode when the incompatibility of the current connection parameters and channel state estimates is detected;

Waiting for an answer—the mode of waiting for the response of the correspondent's modem. The waiting time is set during the modem configuration process and must be greater than the sum of the propagation delays in the forward and reverse directions;

Receiving parameters (Phase 4)—reception of the proposed connection parameters (speed and the like);

Connection parameters negotiation (Phase 4)—the mode of transmission of the agreed connection parameters. The agreed connection speed can only be equal to or less than the speed offered by the correspondent modem;

Sequence training transmission (Phase 6)—the mode of transmission of the test sequence at selected speed. When receiving a test sequence, the presence of errors is monitored. When errors are detected, the connection is restarted;

Transmission and Receipt (Phase 7)—data status at the selected speed. When receiving the test sequence, the presence of synchronization and errors is monitored. When errors are detected, the connection is restarted.

What is claimed is:

1. A method of set up of PSTN modem connection, which includes setting access to the data channel, identifying channel characteristics, configuring PSTN modems depending on the characteristics of the channel, configuring echo compensators of PSTN modems, negotiating the connection protocol and data transfer between PSTN modems according to the configuration using the agreed protocol where:
    data transmission is carried out in duplex mode with the separation of signals of reception and transmission by echo compensation,
    identification of channel characteristics and adjustment of the echo compensator of each of the PSTN modems is performed, respectively, when receiving and transmitting at least one training sequence by each PSTN modem,
    access to the data channel is carried out by sending call by PSTN modem, which contains the training sequence and connection parameters for negotiation, where
    using a multiple access protocol, when each of the PSTN modems is connected to the data channel asynchronously, characterized in that
    the connection protocol negotiation includes role allocation, signal parameter negotiation, and data rate wherein
    the distribution of roles includes assigning the modem that first received the call as the answering modem, followed by this modem sending a message in response to the modem from which the call was received, and
    an independent assignment of a pause after a call by each PSTN modem is performed, whereas the pause is defined as a random variable that has a distribution of the baseline value close to normal, the mean value of which is greater than the expected delay in the channel, and is within the standard deviation less than the mathematical expectation of time delays, and
    the conditions of normality of the random variable distribution and standard deviation are determined by PSTN-modem on the basis of machine learning algorithm.

2. The method according to claim 1, characterized in that after switching on, each of the PSTN modems enters the call reception mode, and in the absence of a call, each PSTN modem transmits a call sequence, and then enters into the mode of receiving response.

3. The method according to claim 1, characterized in that after receiving the response, the PSTN modem determines mutually acceptable parameters of the data signal and the data rate, followed by the transmission of the sequence of confirmation of the selected parameters to another PSTN modem and the start of information transmission at the agreed rate.

4. The method according to claim 1, characterized in that random numbering of each call and ignoring the answer with the number that coincides with the number of the last call is applied.

5. PSTN modem, which includes a means of communication with a telephone line (10), modulator/demodulator, at least one encoder, echo compensator (12), equalizer (16), at least one decision-making device (17), automatic connection protocol processor (20), the input of which is connected to the output of the serializer (19) and the output of the decoder (17),
    and the output of the automatic connection protocol processor (20) is connected to the switch (1) that is used as data transmission mean in duplex mode, and
    the automatic connection protocol processor (20) is suitable for alternating the phases of connection set up and installation of connection protocol data depending on the results of the evaluation of the characteristics of the channel by the modem and the information received from the modem from which the response was received, characterized in that further comprises digital-to-analog converter (8) and analog-to-digital converter (11), scrambler (2), deserializer (3), transmission filter (6), and series-connected input filter (15), descrambler (18) and serializer (19),
    and lattice encoder (4) and signal encoder (5) are used as the encoder, and
    the automatic connection protocol processor (20) is suitable for connection protocol negotiation that includes role allocation, signal parameter negotiation, and data rate wherein
    the distribution of roles includes assigning the modem that first received the call as the answering modem, followed by this modem sending a message in response to the modem from which the call was received, and
    the automatic connection protocol processor (20) is suitable for an independent assignment of a pause, whereas the pause is defined as a random variable that has a distribution of the baseline value close to normal, the mean value of which is greater than the expected delay in the channel, and is within the standard deviation less than the mathematical expectation of time delays, and
    the automatic connection protocol processor (20) is suitable to determine the conditions of normality of the random variable distribution and standard deviation on the basis of machine learning algorithm.

6. PSTN modem according to claim 5, characterized in that the automatic connection protocol processor (20) is connected to the switch (1) to transmit switch control data.

7. PSTN modem according to claim 6, characterized in that the automatic connection protocol processor (20) is connected to the switch (1) to transmit connection protocol data.

8. PSTN modem according to claim 7, characterized in that the connection protocol data includes the connection phase and data rate and the parameters of the data signal.

9. PSTN modem according to claim 5, characterized in that the said modem additionally contains a frequency response corrector (14), and the input of the automatic connection protocol processor (20) is connected to the input of the frequency response corrector (14).

* * * * *